(12) United States Patent
Jiang et al.

(10) Patent No.: US 11,610,296 B2
(45) Date of Patent: Mar. 21, 2023

(54) PROJECTION AND DISTANCE SEGMENTATION ALGORITHM FOR WAFER DEFECT DETECTION

(71) Applicant: KLA CORPORATION, Milpitas, CA (US)

(72) Inventors: Xuguang Jiang, San Jose, CA (US); Juhwan Rha, San Jose, CA (US)

(73) Assignee: KLA CORPORATION, Milpitas, CA (US)

( * ) Notice: Subject to any disclaimer, the term of this patent is extended or adjusted under 35 U.S.C. 154(b) by 254 days.

(21) Appl. No.: 17/124,472

(22) Filed: Dec. 16, 2020

(65) Prior Publication Data

US 2021/0217159 A1    Jul. 15, 2021

Related U.S. Application Data

(60) Provisional application No. 62/959,066, filed on Jan. 9, 2020.

(51) Int. Cl.
| | | |
|---|---|---|
| *G06T 7/00* | (2017.01) | |
| *G06T 7/11* | (2017.01) | |
| *G06T 7/136* | (2017.01) | |
| *G01N 21/88* | (2006.01) | |
| *G01N 21/95* | (2006.01) | |

(52) U.S. Cl.
CPC ....... *G06T 7/0004* (2013.01); *G01N 21/8851* (2013.01); *G01N 21/9505* (2013.01); *G06T 7/11* (2017.01); *G06T 7/136* (2017.01); *G01N 2021/8887* (2013.01); *G01N 2201/06113* (2013.01); *G06T 2207/30148* (2013.01)

(58) Field of Classification Search
CPC ......... G06T 7/0004; G06T 7/11; G06T 7/136; G06T 2207/30148; G01N 21/8851; G01N 21/9505; G01N 2021/8887; G01N 2201/06113
See application file for complete search history.

(56) References Cited

U.S. PATENT DOCUMENTS

| | | | |
|---|---|---|---|
| 9,702,829 B1 | 7/2017 | Chen et al. | |
| 2013/0035876 A1* | 2/2013 | Huang | ................. G01N 21/956 702/40 |
| 2013/0188859 A1 | 7/2013 | Luo et al. | |
| 2014/0212024 A1 | 7/2014 | Chen et al. | |
| 2017/0169552 A1* | 6/2017 | Brauer | .................... G06T 7/001 |
| 2018/0204315 A1 | 7/2018 | Plihal et al. | |
| 2019/0108422 A1 | 4/2019 | Cantwell | |

FOREIGN PATENT DOCUMENTS

JP            6009956 B2     10/2016

OTHER PUBLICATIONS

WIPO, ISR for PCT/US2021/012022, Apr. 29, 2021.

* cited by examiner

*Primary Examiner* — Edward F Urban
*Assistant Examiner* — Wassim Mahrouka
(74) *Attorney, Agent, or Firm* — Hodgson Russ LLP

(57) ABSTRACT

A projection is determined in a semiconductor image, which can be an X projection and/or a Y projection. At least one threshold is applied to the projection thereby forming at least one segment within the region. A fine segment can be determined in the region using a distance value from the projection. Defect detection can be performed in one of the fine segments.

19 Claims, 3 Drawing Sheets

PROJECTION AND DISTANCE SEGMENTATION ALGORITHM FOR WAFER DEFECT DETECTION

CROSS-REFERENCE TO RELATED APPLICATIONS

This application claims priority to the provisional patent application filed Jan. 9, 2020 and assigned U.S. App. No. 62/959,066, the disclosure of which is hereby incorporated by reference.

FIELD OF THE DISCLOSURE

This disclosure relates to semiconductor wafer inspection.

BACKGROUND OF THE DISCLOSURE

Evolution of the semiconductor manufacturing industry is placing greater demands on yield management and, in particular, on metrology and inspection systems. Critical dimensions continue to shrink, yet the industry needs to decrease time for achieving high-yield, high-value production. Minimizing the total time from detecting a yield problem to fixing it determines the return-on-investment for a semiconductor manufacturer.

Fabricating semiconductor devices, such as logic and memory devices, typically includes processing a semiconductor wafer using a large number of fabrication processes to form various features and multiple levels of the semiconductor devices. For example, lithography is a semiconductor fabrication process that involves transferring a pattern from a reticle to a photoresist arranged on a semiconductor wafer. Additional examples of semiconductor fabrication processes include, but are not limited to, chemical-mechanical polishing (CMP), etch, deposition, and ion implantation. An arrangement of multiple semiconductor devices fabricated on a single semiconductor wafer may be separated into individual semiconductor devices.

Inspection processes are used at various steps during semiconductor manufacturing to detect defects on wafers to promote higher yield in the manufacturing process and, thus, higher profits. Inspection has always been an important part of fabricating semiconductor devices such as integrated circuits (ICs). However, as the dimensions of semiconductor devices decrease, inspection becomes even more important to the successful manufacture of acceptable semiconductor devices because smaller defects can cause the devices to fail. For instance, as the dimensions of semiconductor devices decrease, detection of defects of decreasing size has become necessary because even relatively small defects may cause unwanted aberrations in the semiconductor devices.

As design rules shrink, however, semiconductor manufacturing processes may be operating closer to the limitation on the performance capability of the processes. In addition, smaller defects can have an impact on the electrical parameters of the device as the design rules shrink, which drives more sensitive inspections. As design rules shrink, the population of potentially yield-relevant defects detected by inspection grows dramatically, and the population of nuisance defects detected by inspection also increases dramatically. Therefore, more defects may be detected on the wafers, and correcting the processes to eliminate all of the defects may be difficult and expensive. Determining which of the defects actually have an effect on the electrical parameters of the devices and the yield may allow process control methods to be focused on those defects while largely ignoring others. Furthermore, at smaller design rules, process-induced failures, in some cases, tend to be systematic. That is, process-induced failures tend to fail at predetermined design patterns often repeated many times within the design. Elimination of spatially-systematic, electrically-relevant defects can have an impact on yield.

In each processing step performed on a semiconductor wafer, the same circuit pattern is printed in each die on the wafer. Most wafer inspection systems take advantage of this fact and use a relatively simple die-to-die comparison to detect defects on the wafer. However, the printed circuit in each die may include many areas of patterned features that repeat in the X or Y direction such as the areas of DRAM, SRAM, or FLASH. This type of area is commonly referred to as an array area (the rest of the areas are called random or logic areas). To achieve better sensitivity, advanced inspection systems employ different strategies for inspecting the array areas and the random or logic areas.

Intensity may be used as a feature of segmentation to group similar intensity pixels together. Then, the same set of defect detection parameters are applied to all of the pixels in the same intensity-based group. However, this method has a number of disadvantages. For example, an intensity-based segmentation algorithm can be used when a geometry feature scatters uniformly. Often, this is not enough. For example, in an intensity-based or sum-of-intensity-based segmentation, a wafer image can be segmented into a quiet array segment, a noisy page break segment, and a noisy intersection segment. However, defects of interest (DOIs) in a quiet segment can be missed if a quiet segment is misclassified as a noisy segment. Segments also can be misclassified when the same cutline between segments leads to different segmentation in training and runtime. Such misclassification of the segments also may be bad for any pre-processing of the image, such as that which removes the periodic pattern in the page break area. As such, segmentation based purely on intensity or sum of intensity is prone to instability related to intensity variation from job-to-job during runtime. Therefore, other property-based segmentation is needed.

Another method for segmenting output of a dark field (DF) inspection system is projection-based segmentation (PBS). PBS provides a way to separate segments in regions based on the relative projected intensity in the X and Y directions. Most of the time, the PBS approach works well. However, since it is used in the pre-processing part of DF wafer inspection algorithms, there are cases when the PBS segmentation result fluctuates along the side of the underlying physical structure pattern, which makes the projection-based segmentation unstable. Some quiet segments are incorrectly segmented as noisy segments and vice versa. The impact is to cause the defect inspection to be less adaptive to local noise. Thus, PBS is generally used only when the region image contains major horizontal and/or vertical patterns. It is difficult to segment with PBS when there is little separation in projection values from different patterns.

An additional method for segmenting output of a dark field inspection system is median intensity-based segmentation (MBS). MBS is more stable than PBS because most of the time the median intensity differences between the array region and page break region are substantial, which provides easier separation between array and page break. However, the segment boundaries from the MBS can be irregular, which might not correlate to the underlying physical structure pattern. Thus, MBS is generally used if the defect and nuisance background intensities are different. It is difficult to use MBS when defect and nuisance have similar background intensities.

There are cases that do not meet the above criteria and, thus, the old segmentation methods are not applicable. Improved methods and systems are needed.

BRIEF SUMMARY OF THE DISCLOSURE

A system is provided in a first embodiment. The system includes a light source that generates light, a stage configured to hold a wafer, a detector that receives the light reflected from the wafer, and a processor in electronic communication with the detector. The processor is configured to determine a projection in a region of an image that is generated from data from the detector. The projection is an X projection in an X direction and/or a Y projection in a Y direction. The X direction and the Y direction are perpendicular. The processor is also configured to apply at least one threshold to the projection thereby forming at least one segment in the region of the image and determine at least one fine segment in the region using at least one distance value from the projection.

The light source can be a laser.

The fine segments can be defined along the X direction or the Y direction. The fine segments also can be defined along the X direction and the Y direction.

The processor can be configured to perform defect detection in one or more of the fine segments.

The image may be a 2D image and the projection can convert the 2D image into 1D data.

The fine segment may be at least five pixels in dimension.

A method is provided in a second embodiment. The method includes determining a projection in a region of an image of a semiconductor wafer using a processor. The projection is an X projection in an X direction and/or a Y projection in a Y direction. The X direction and the Y direction are perpendicular. The method also includes applying at least one threshold to the projection using the processor thereby forming at least one segment in the region of the image and determining, using the processor, at least one fine segment in the region using at least one distance value from the projection.

The fine segments can be defined along the X direction or the Y direction. The fine segments also can be defined along the X direction and the Y direction.

The method can further include performing defect detection in one or more of the fine segments.

The image may be a 2D image and the projection can convert the 2D image into 1D data.

The fine segment may be at least five pixels in dimension.

A non-transitory computer-readable storage medium is provided in a third embodiment. The non-transitory computer-readable storage medium comprises one or more programs for executing steps on one or more computing devices. The steps include determining a projection in a region of an image of a semiconductor wafer. The projection is an X projection in an X direction and/or a Y projection in a Y direction. The X direction and the Y direction are perpendicular. The steps also include applying at least one threshold to the projection thereby forming at least one segment in the region of the image and determining at least one fine segment in the region using at least one distance value from the projection.

The fine segments can be defined along the X direction or the Y direction. The fine segments also can be defined along the X direction and the Y direction.

The steps can further include performing defect detection in one or more of the fine segments.

The image may be a 2D image and the projection can convert the 2D image into 1D data.

The fine segment may be at least five pixels in dimension.

DESCRIPTION OF THE DRAWINGS

For a fuller understanding of the nature and objects of the disclosure, reference should be made to the following detailed description taken in conjunction with the accompanying drawings, in which.

DETAILED DESCRIPTION OF THE DISCLOSURE

Although claimed subject matter will be described in terms of certain embodiments, other embodiments, including embodiments that do not provide all of the benefits and features set forth herein, are also within the scope of this disclosure. Various structural, logical, process step, and electronic changes may be made without departing from the scope of the disclosure. Accordingly, the scope of the disclosure is defined only by reference to the appended claims.

Embodiments disclosed herein can be used for defect detection of images of semiconductor wafers or devices on a semiconductor wafer. A segmentation algorithm can separate an image of a region of a semiconductor wafer, which may be generated using an inspection system, into different segments. The segmentation algorithm can be referred to as projection and distance segmentation (PDS). This can improve defect detection sensitivity and suppress nuisance or false events.

Figure 1:
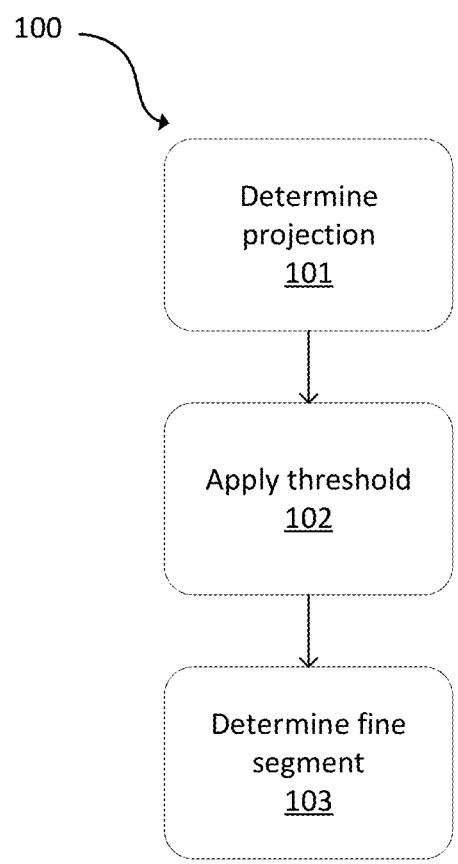
FIG. 1 is a flowchart of a method in accordance with the present disclosure.

FIG. 1 is an embodiment of a method 100. Some or all of the steps of the method 100 can be performed using a processor. In the method 100, a region of a semiconductor image is segmented into a plurality of segments. This divides the image or region of the image into initial segments.

A projection in the image is determined at 101. Projection is the operation to convert a 2D image into a 1D data. To determine a projection, all pixel intensities along a horizontal or vertical line can be added and divided by the total pixel count. Projection can suppress pixel intensity variations in the 2D image. If the 2D image contains blocks with different intensities, then the projected 1D data can have stable boundaries of the blocks. The projection can be an X projection in the X direction and/or a Y projection in the Y direction of the semiconductor image. The X direction and the Y direction may be perpendicular.

A projection can be calculated in a region. A region is a rectangular or other shaped area in the image. For X and Y directions, the projection can start at one side of the region and end at the other side.

At 102, at least one threshold is applied to the projection thereby forming two or more initial segments within the region. A user can manually input a threshold. The image and its projections can be displayed on a user interface. The user can set the threshold based on information about the device, information displayed on the user interface, or a potential location of any defects. The initial segments can be defined along an X direction or a Y direction. The initial segments also can be defined along an X direction and a Y direction. Defining the initial segments along an X direction and a Y direction can result in a checkerboard type segmentation. In an instance, a threshold can be defined in both the X direction and Y direction and these thresholds can be different in the X direction and the Y direction.

In an instance, the threshold is applied to a 1D projection. A point on the projection corresponds to a horizontal or vertical line in the 2D region image. The segment starts and ends at the boundary of the region.

The fine segmentation that is determined at 103 can be based on a distance from a projection. The fine segment may always be within the initial segment or segments. For example, applying the threshold to the projection can result in an initial segment. Starting from an initial segment boundary, fine segments can defined using one or more distance values. A user can combine different grids or boxes of the fine segment into one segment. Thus, the combination can be flexible.

The PDS algorithm can improve segmentation for certain images or certain applications. There are instances when a DOI is under a wafer surface. The wafer image from an inspection system may not contain clear pattern information under the wafer surface due to limits of the optical imaging. It can be difficult to apply PBS or MBS in this example. Using PDS, a user can find a nearby structure with acceptable contrast (e.g., an array-pagebreak boundary). Segmentation can be created using distance values obtained from a design of the semiconductor device, an optical image, or other sources. The fine segment calculation in PDS can be independent of image contrast, which can allow PDS to be used in low contrast situations, off-focus situations, or other situations.

Defect detection can then be performed in one or more of the fine segments. During defect inspection, a corresponding segment's recipe parameter can be used for defect detection. For example, each pixel's segment identification can be used to select a recipe parameter.

Figure 2C:
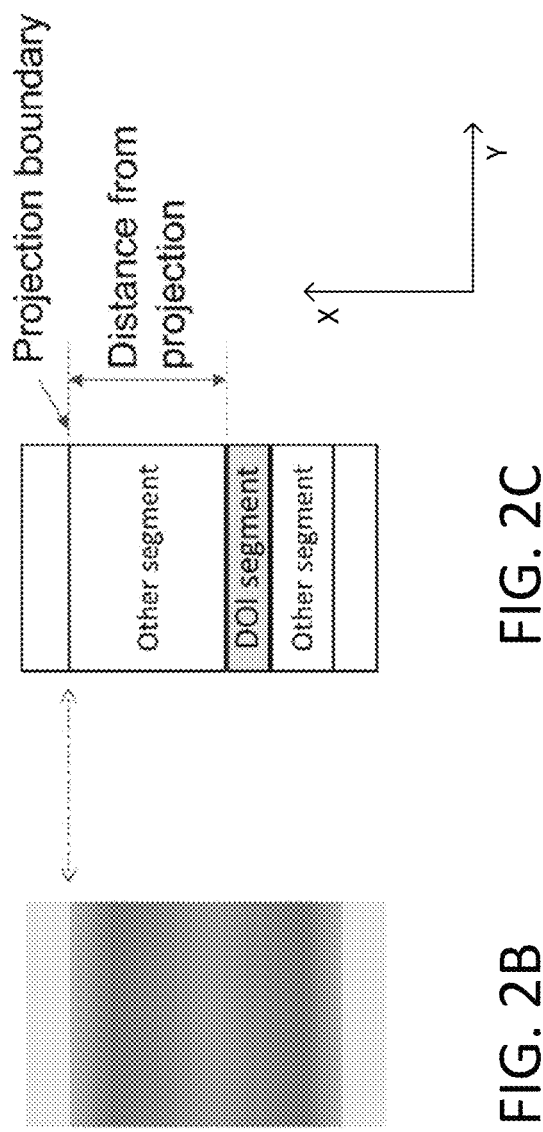
FIGS. 2A-2C are diagrams illustrating an embodiment of a method in accordance with the present disclosure.
Figure 2B:
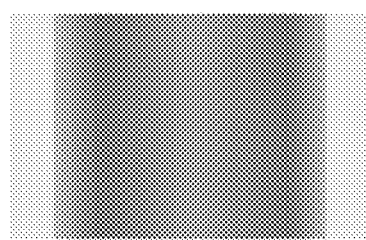
Figure 2A:
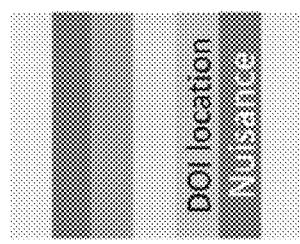

FIGS. 2A-2C are diagrams illustrating another embodiment of the method 100. FIGS. 2A-2C illustrates defining fine segments using distance values from the projection using an example of 3D patterns shown under a wafer surface. The embodiment of FIGS. 2A-2C may be helpful with DOI buried in a 3D structure.

The DOI location and nuisance location can have different heights within the wafer (e.g., between the two flat surfaces of the semiconductor wafer). FIG. 2A shows a wafer pattern. The DOI location is below the surface of the wafer and above the nuisance. The DOI location may need to be segmented for better inspection sensitivity because the nuisance source is close to a DOI location on the wafer. The image from an inspection system is shown in FIG. 2B. There is no clear pattern to easily find the DOI location. The inspection image does not have features to separate the DOI and nuisance areas.

FIG. 2C is an example of the PDS segmentation result. The DOI segment is defined, which is an example of a fine segment. A fine segment may be at least five pixels in size and may be up to 10, 20, 30, or more pixels to enable defect detection of a defect under a surface of the semiconductor wafer. The PDS algorithm uses projection and distance information to define the segment with the DOI. This can be based on the design of the semiconductor device and a distance value from the projection. The projection boundary is defined in FIG. 2C. The projection boundary may be an edge of a projection that is determined.

A distance from the projection is shown between the projection boundary and the DOI segment. A user may need to know the pattern on the wafer. So even though the patterns are not clear in the image, the user can know or approximate the relative location. In FIG. 2C, the projection location is defined from the method 100 in FIG. 1. In FIG. 2C, the X and/or Y value of projection boundary is known. Then the DOI segment is defined at a distance value of pixels down the projection boundary along the X and/or Y direction.

While one fine segment with DOI is illustrated in FIG. 2C, more than one fine segment with DOI may be present.

In another example, a user can grab an image around an area of interest. Using an anchor point or an edge detection method, the algorithm can determine an X projection and/or a Y projection. The user can set an X projection threshold and/or a Y direction threshold to define the initial segments. Initial segments can be calculated and an initial segment mask can be displayed over the image. The user can adjust threshold values and repeat the previous steps until the initial segments are well-defined. A well-defined segment can be based on a corresponding design file. If the design of the semiconductor device is known, then an expected pattern in the image can be assumed.

Initial segments are can be defined by the projection. For example, one projection can define two initial segments. Then fine segments can be defined using a distance in one of the initial segments. The segment mask can be used to highlight the initial segment area on the image.

The user then can set X distance values and/or Y distance values to define fine segments. Distance values can be used to define fine segment inside of the initial segment. The distance can represent a depth or distance of a DOI from a known point. A threshold can be applied to pixel intensity, while the distance can be applied to a pixel coordinate. The fine segments can then be determined. A fine segment mask can be displayed over the image. The user can adjust the distance values and repeat the previous steps until the fine segments are well-defined. A user may need to view the fine segment mask and the image patterns. Because the user may know where the DOI segments are located, the user can verify whether the fine segment mask aligns well to the DOI location.

The PDS parameters can be saved into a recipe. The PDS recipe can be used for defect detection.

Figure 3:
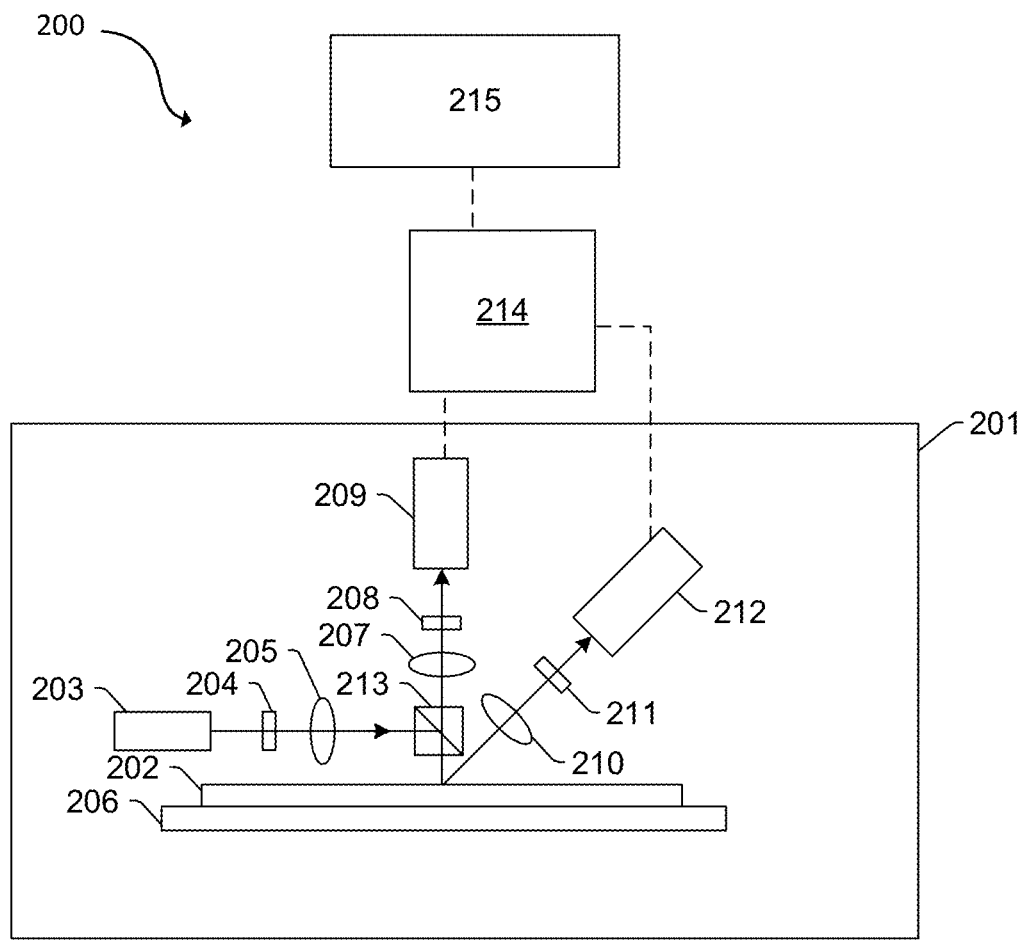
FIG. 3 is a system in accordance with the present disclosure.

One embodiment of a system 200 is shown in FIG. 3. The system 200 includes optical based subsystem 201. In general, the optical based subsystem 201 is configured for generating optical based output for a specimen 202 by directing light to (or scanning light over) and detecting light from the specimen 202. In one embodiment, the specimen 202 includes a wafer. The wafer may include any wafer known in the art. In another embodiment, the specimen 202 includes a reticle. The reticle may include any reticle known in the art.

In the embodiment of the system 200 shown in FIG. 3, optical based subsystem 201 includes an illumination subsystem configured to direct light to specimen 202. The illumination subsystem includes at least one light source. For example, as shown in FIG. 3, the illumination subsystem includes light source 203. In one embodiment, the illumination subsystem is configured to direct the light to the specimen 202 at one or more angles of incidence, which may include one or more oblique angles and/or one or more normal angles. For example, as shown in FIG. 3, light from light source 203 is directed through optical element 204 and then lens 205 to specimen 202 at an oblique angle of incidence. The oblique angle of incidence may include any suitable oblique angle of incidence, which may vary depending on, for instance, characteristics of the specimen 202.

The optical based subsystem 201 may be configured to direct the light to the specimen 202 at different angles of incidence at different times. For example, the optical based subsystem 201 may be configured to alter one or more characteristics of one or more elements of the illumination subsystem such that the light can be directed to the specimen 202 at an angle of incidence that is different than that shown in FIG. 3. In one such example, the optical based subsystem 201 may be configured to move light source 203, optical element 204, and lens 205 such that the light is directed to the specimen 202 at a different oblique angle of incidence or a normal (or near normal) angle of incidence.

In some instances, the optical based subsystem 201 may be configured to direct light to the specimen 202 at more than one angle of incidence at the same time. For example, the illumination subsystem may include more than one illumination channel, one of the illumination channels may include light source 203, optical element 204, and lens 205 as shown in FIG. 3 and another of the illumination channels (not shown) may include similar elements, which may be configured differently or the same, or may include at least a light source and possibly one or more other components such as those described further herein. If such light is directed to the specimen at the same time as the other light, one or more characteristics (e.g., wavelength, polarization, etc.) of the light directed to the specimen 202 at different angles of incidence may be different such that light resulting from illumination of the specimen 202 at the different angles of incidence can be discriminated from each other at the detector(s).

In another instance, the illumination subsystem may include only one light source (e.g., light source 203 shown in FIG. 3) and light from the light source may be separated into different optical paths (e.g., based on wavelength, polarization, etc.) by one or more optical elements (not shown) of the illumination subsystem. Light in each of the different optical paths may then be directed to the specimen 202. Multiple illumination channels may be configured to direct light to the specimen 202 at the same time or at different times (e.g., when different illumination channels are used to sequentially illuminate the specimen). In another instance, the same illumination channel may be configured to direct light to the specimen 202 with different characteristics at different times. For example, in some instances, optical element 204 may be configured as a spectral filter and the properties of the spectral filter can be changed in a variety of different ways (e.g., by swapping out the spectral filter) such that different wavelengths of light can be directed to the specimen 202 at different times. The illumination subsystem may have any other suitable configuration known in the art for directing the light having different or the same characteristics to the specimen 202 at different or the same angles of incidence sequentially or simultaneously.

In one embodiment, light source 203 may include a broadband plasma (BBP) source. In this manner, the light generated by the light source 203 and directed to the specimen 202 may include broadband light. However, the light source may include any other suitable light source such as a laser. The laser may include any suitable laser known in the art and may be configured to generate light at any suitable wavelength or wavelengths known in the art. In addition, the laser may be configured to generate light that is monochromatic or nearly-monochromatic. In this manner, the laser may be a narrowband laser. The light source 203 may also include a polychromatic light source that generates light at multiple discrete wavelengths or wavebands.

Light from optical element 204 may be focused onto specimen 202 by lens 205. Although lens 205 is shown in FIG. 3 as a single refractive optical element, it is to be understood that, in practice, lens 205 may include a number of refractive and/or reflective optical elements that in combination focus the light from the optical element to the specimen. The illumination subsystem shown in FIG. 3 and described herein may include any other suitable optical elements (not shown). Examples of such optical elements include, but are not limited to, polarizing component(s), spectral filter(s), spatial filter(s), reflective optical element(s), apodizer(s), beam splitter(s) (such as beam splitter 213), aperture(s), and the like, which may include any such suitable optical elements known in the art. In addition, the optical based subsystem 201 may be configured to alter one or more of the elements of the illumination subsystem based on the type of illumination to be used for generating the optical based output.

The optical based subsystem 201 may also include a scanning subsystem configured to cause the light to be scanned over the specimen 202. For example, the optical based subsystem 201 may include stage 206 on which specimen 202 is disposed during optical based output generation. The scanning subsystem may include any suitable mechanical and/or robotic assembly (that includes stage 206) that can be configured to move the specimen 202 such that the light can be scanned over the specimen 202. In addition, or alternatively, the optical based subsystem 201 may be configured such that one or more optical elements of the optical based subsystem 201 perform some scanning of the light over the specimen 202. The light may be scanned over the specimen 202 in any suitable fashion such as in a serpentine-like path or in a spiral path.

The optical based subsystem 201 further includes one or more detection channels. At least one of the one or more detection channels includes a detector configured to detect light from the specimen 202 due to illumination of the specimen 202 by the subsystem and to generate output responsive to the detected light. For example, the optical based subsystem 201 shown in FIG. 3 includes two detection channels, one formed by collector 207, element 208, and detector 209 and another formed by collector 210, element 211, and detector 212. As shown in FIG. 3, the two detection channels are configured to collect and detect light at different angles of collection. In some instances, both detection channels are configured to detect scattered light, and the detection channels are configured to detect tight that is scattered at different angles from the specimen 202. However, one or more of the detection channels may be configured to detect another type of light from the specimen 202 (e.g., reflected light).

As further shown in FIG. 3, both detection channels are shown positioned in the plane of the paper and the illumination subsystem is also shown positioned in the plane of the paper. Therefore, in this embodiment, both detection channels are positioned in (e.g., centered in) the plane of incidence. However, one or more of the detection channels may be positioned out of the plane of incidence. For example, the detection channel formed by collector 210, element 211, and detector 212 may be configured to collect and detect light that is scattered out of the plane of incidence. Therefore, such a detection channel may be commonly referred to as a "side" channel, and such a side channel may be centered in a plane that is substantially perpendicular to the plane of incidence.

Although FIG. 3 shows an embodiment of the optical based subsystem 201 that includes two detection channels, the optical based subsystem 201 may include a different number of detection channels (e.g., only one detection channel or two or more detection channels). In one such instance, the detection channel formed by collector 210, element 211, and detector 212 may form one side channel as described above, and the optical based subsystem 201 may include an additional detection channel (not shown) formed as another side channel that is positioned on the opposite side of the plane of incidence. Therefore, the optical based subsystem 201 may include the detection channel that includes collector 207, element 208, and detector 209 and that is centered in the plane of incidence and configured to collect and detect light at scattering angle(s) that are at or close to normal to the specimen 202 surface. This detection channel may therefore be commonly referred to as a "top" channel, and the optical based subsystem 201 may also include two or more side channels configured as described above. As such, the optical based subsystem 201 may include at least three channels (i.e., one top channel and two side channels), and each of the at least three channels has its own collector, each of which is configured to collect light at different scattering angles than each of the other collectors.

As described further above, each of the detection channels included in the optical based subsystem 201 may be configured to detect scattered light. Therefore, the optical based subsystem 201 shown in FIG. 3 may be configured for dark field (DF) output generation for specimens 202. However, the optical based subsystem 201 may also or alternatively include detection channel(s) that are configured for bright field (BF) output generation for specimens 202. In other words, the optical based subsystem 201 may include at least one detection channel that is configured to detect light specularly reflected from the specimen 202. Therefore, the optical based subsystems 201 described herein may be configured for only DF, only BF, or both DF and BF imaging. Although each of the collectors are shown in FIG. 3 as single refractive optical elements, it is to be understood that each of the collectors may include one or more refractive optical die(s) and/or one or more reflective optical element(s).

The one or more detection channels may include any suitable detectors known in the art. For example, the detectors may include photo-multiplier tubes (PMTs), charge coupled devices (CCDs), time delay integration (TDI) cameras, and any other suitable detectors known in the art. The detectors may also include non-imaging detectors or imaging detectors. In this manner, if the detectors are non-imaging detectors, each of the detectors may be configured to detect certain characteristics of the scattered light such as intensity but may not be configured to detect such characteristics as a function of position within the imaging plane. As such, the output that is generated by each of the detectors included in each of the detection channels of the optical based subsystem may be signals or data, but not image signals or image data. In such instances, a processor such as processor 214 may be configured to generate images of the specimen 202 from the non-imaging output of the detectors. However, in other instances, the detectors may be configured as imaging detectors that are configured to generate imaging signals or image data. Therefore, the optical based subsystem may be configured to generate optical images or other optical based output described herein in a number of ways.

It is noted that FIG. 3 is provided herein to generally illustrate a configuration of an optical based subsystem 201 that may be included in the system embodiments described herein or that may generate optical based output that is used by the system embodiments described herein. The optical based subsystem 201 configuration described herein may be altered to optimize the performance of the optical based subsystem 201 as is normally performed when designing a commercial output acquisition system. In addition, the systems described herein may be implemented using an existing system (e.g., by adding functionality described herein to an existing system). For some such systems, the methods described herein may be provided as optional functionality of the system (e.g., in addition to other functionality of the system). Alternatively, the system described herein may be designed as a completely new system.

The processor 214 may be coupled to the components of the system 200 in any suitable manner (e.g., via one or more transmission media, which may include wired and/or wireless transmission media) such that the processor 214 can receive output. The processor 214 may be configured to perform a number of functions using the output. The system 200 can receive instructions or other information from the processor 214. The processor 214 and/or the electronic data storage unit 215 optionally may be in electronic communication with a wafer inspection tool, a wafer metrology tool, or a wafer review tool (not illustrated) to receive additional information or send instructions. For example, the processor 214 and/or the electronic data storage unit 215 can be in electronic communication with a scanning electron microscope.

The processor 214, other system(s), or other subsystem(s) described herein may be part of various systems, including a personal computer system, image computer, mainframe computer system, workstation, network appliance, internet appliance, or other device. The subsystem(s) or system(s) may also include any suitable processor known in the art, such as a parallel processor. In addition, the subsystem(s) or system(s) may include a platform with high-speed processing and software, either as a standalone or a networked tool.

The processor 214 and electronic data storage unit 215 may be disposed in or otherwise part of the system 200 or another device. In an example, the processor 214 and electronic data storage unit 215 may be part of a standalone control unit or in a centralized quality control unit. Multiple processors 214 or electronic data storage units 215 may be used.

The processor 214 may be implemented in practice by any combination of hardware, software, and firmware. Also, its functions as described herein may be performed by one unit, or divided up among different components, each of which may be implemented in turn by any combination of hardware, software and firmware. Program code or instructions for the processor 214 to implement various methods and functions may be stored in readable storage media, such as a memory in the electronic data storage unit 215 or other memory.

If the system 200 includes more than one processor 214, then the different subsystems may be coupled to each other such that images, data, information, instructions, etc. can be sent between the subsystems. For example, one subsystem may be coupled to additional subsystem(s) by any suitable transmission media, which may include any suitable wired and/or wireless transmission media known in the art. Two or more of such subsystems may also be effectively coupled by a shared computer-readable storage medium (not shown).

The processor 214 may be configured to perform a number of functions using the output of the system 200 or other output. For instance, the processor 214 may be configured to send the output to an electronic data storage unit 215 or another storage medium. The processor 214 may be further configured as described herein.

Various steps, functions, and/or operations of system 200 and the methods disclosed herein are carried out by one or more of the following: electronic circuits, logic gates, multiplexers, programmable logic devices, ASICs, analog or digital controls/switches, microcontrollers, or computing systems. Program instructions implementing methods such as those described herein may be transmitted over or stored on carrier medium. The carrier medium may include a storage medium such as a read-only memory, a random access memory, a magnetic or optical disk, a non-volatile memory, a solid state memory, a magnetic tape, and the like. A carrier medium may include a transmission medium such as a wire, cable, or wireless transmission link. For instance, the various steps described throughout the present disclosure may be carried out by a single processor 214 or, alternatively, multiple processors 214. Moreover, different subsystems of the system 200 may include one or more computing or logic systems. Therefore, the above description should not be interpreted as a limitation on the present disclosure but merely an illustration.

In an instance, the processor 214 is in communication with the system 200. The processor 214 can be configured to perform any of the embodiments disclosed herein, such as the method 100 of FIG. 1. In an instance, the processor 214 is configured to determine a projection in a region of an image that is generated from data from the detector. The projection is an X projection in an X direction and/or a Y projection in a Y direction. The X direction and the Y direction are perpendicular. At least one threshold is applied to the projection thereby forming at least one segment in the region of the image. At least one fine segment in the region is determined using at least one distance value from the projection. The processor 214 can be further configured to perform defect detection in one or more of the fine segments. The processor 214 also may be configured to perform other functions or additional steps using the output of the system 200 or using images or data from other sources.

An additional embodiment relates to a non-transitory computer-readable medium storing program instructions executable on a controller for performing a computer-implemented method for wafer inspection, as disclosed herein. In particular, as shown in FIG. 3, electronic data storage unit 215 or other storage medium may contain non-transitory computer-readable medium that includes program instructions executable on the processor 214. The computer-implemented method may include any step(s) of any method(s) described herein, including method 100.

In an instance, the steps include determining a projection in a region of an image of a semiconductor wafer, applying at least one threshold to the projection thereby forming at least one segment in the region of the image, and determining at least one fine segment in the region using at least one distance value from the projection. The projection can be an X projection and/or a Y projection.

The program instructions may be implemented in any of various ways, including procedure-based techniques, component-based techniques, and/or object-oriented techniques, among others. For example, the program instructions may be implemented using ActiveX controls, C++ objects, JavaBeans, Microsoft Foundation Classes (MFC), Streaming SIMD Extension (SSE), or other technologies or methodologies, as desired.

As used herein, the term "wafer" generally refers to substrates formed of a semiconductor or non-semiconductor material. Examples of such a semiconductor or non-semiconductor material include, but are not limited to, monocrystalline silicon, gallium nitride, gallium arsenide, indium phosphide, sapphire, and glass. Such substrates may be commonly found and/or processed in semiconductor fabrication facilities.

A wafer may include one or more layers formed upon a substrate. For example, such layers may include, but are not limited to, a photoresist, a dielectric material, a conductive material, and a semiconductive material. Many different types of such layers are known in the art, and the term wafer as used herein is intended to encompass a wafer including all types of such layers.

One or more layers formed on a wafer may be patterned or unpatterned. For example, a wafer may include a plurality of dies, each having repeatable patterned features or periodic structures. Formation and processing of such layers of material may ultimately result in completed devices. Many different types of devices may be formed on a wafer, and the term wafer as used herein is intended to encompass a wafer on which any type of device known in the art is being fabricated.

Other types of wafers also may be used. For example, the wafer may be used to manufacture LEDs, solar cells, magnetic discs, flat panels, or polished plates. Defects on other objects also may be classified using techniques and systems disclosed herein.

Each of the steps of the method may be performed as described herein. The methods also may include any other step(s) that can be performed by the processor and/or computer subsystem(s) or system(s) described herein. The steps can be performed by one or more computer systems, which may be configured according to any of the embodiments described herein. In addition, the methods described above may be performed by any of the system embodiments described herein.

Although the present disclosure has been described with respect to one or more particular embodiments, it will be understood that other embodiments of the present disclosure may be made without departing from the scope of the present disclosure. Hence, the present disclosure is deemed limited only by the appended claims and the reasonable interpretation thereof.

What is claimed is:

1. A system comprising:
a light source that generates light;
a stage configured to hold a wafer;
a detector that receives the light reflected from the wafer; and
a processor in electronic communication with the detector, wherein the processor is configured to:
determine a projection in a region of an image that is generated from data from the detector, wherein the projection is an X projection in an X direction and/or a Y projection in a Y direction, and wherein the X direction and the Y direction are perpendicular;
apply at least one threshold to the projection thereby forming at least one segment in the region of the image; and
determine at least one fine segment in the region using at least one distance value from the projection.

2. The system of claim 1, wherein the light source is a laser.

3. The system of claim 1, wherein the fine segments are defined along the X direction or the Y direction.

4. The system of claim 1, wherein the fine segments are defined along the X direction and the Y direction.

5. The system of claim 1, wherein the processor is further configured to perform defect detection in one or more of the fine segments.

6. The system of claim 1, wherein the image is a 2D image and wherein the projection converts the 2D image into 1D data.

7. The system of claim 1, wherein the fine segment is at least five pixels in dimension.

8. A method comprising:
   determining a projection in a region of an image of a semiconductor wafer using a processor, wherein the projection is an X projection in an X direction and/or a Y projection in a Y direction, and wherein the X direction and the Y direction are perpendicular;
   applying at least one threshold to the projection using the processor thereby forming at least one segment in the region of the image; and
   determining, using the processor, at least one fine segment in the region using at least one distance value from the projection.

9. The method of claim 8, wherein the fine segments are defined along the X direction or the Y direction.

10. The method of claim 8, wherein the fine segments are defined along the X direction and the Y direction.

11. The method of claim 8, wherein the method further comprises performing defect detection in one or more of the fine segments.

12. The method of claim 8, wherein the image is a 2D image and wherein the projection converts the 2D image into 1D data.

13. The method of claim 8, wherein the fine segment is at least five pixels in dimension.

14. A non-transitory computer-readable storage medium, comprising one or more programs for executing the following steps on one or more computing devices:
   determine a projection in a region of an image of a semiconductor wafer, wherein the projection is an X projection in an X direction and/or a Y projection in a Y direction, and wherein the X direction and the Y direction are perpendicular;
   apply at least one threshold to the projection thereby forming at least one segment in the region of the image; and
   determine at least one fine segment in the region using at least one distance value from the projection.

15. The non-transitory computer-readable storage medium of claim 14, wherein the fine segments are defined along the X direction or the Y direction.

16. The non-transitory computer-readable storage medium of claim 14, wherein the fine segments are defined along the X direction and the Y direction.

17. The non-transitory computer-readable storage medium of claim 14, wherein the steps further include performing defect detection in one or more of the fine segments.

18. The non-transitory computer-readable storage medium of claim 14, wherein the image is a 2D image and wherein the projection converts the 2D image into 1D data.

19. The non-transitory computer-readable storage medium of claim 14, wherein the fine segment is at least five pixels in dimension.

* * * * *